(12) United States Patent
Patel et al.

(10) Patent No.: US 12,309,050 B2
(45) Date of Patent: May 20, 2025

(54) NETWORK COMPUTING FOR NETWORK FUNCTION TESTING

(71) Applicant: DISH Wireless L.L.C., Englewood, CO (US)

(72) Inventors: Harsh Patel, Englewood, CO (US); Maria Manisha Miranda, Denver, CO (US); Anaghaa Mangesh Londhe, Denver, CO (US); Jingda Xu, Lakewood, CO (US); David Ezeji, Englewood, CO (US); Shubham Singh, Centennial, CO (US); Tamanna Kawatra, Highlands Ranch, CO (US); Geetanjali Makineni, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 3 days.

(21) Appl. No.: 18/225,843

(22) Filed: Jul. 25, 2023

(65) Prior Publication Data

US 2025/0039073 A1 Jan. 30, 2025

(51) Int. Cl.
*G06F 9/44* (2018.01)
*G06F 9/451* (2018.01)
*G06F 9/455* (2018.01)
*G06F 11/30* (2006.01)
*G06F 11/36* (2025.01)
*H04L 43/20* (2022.01)

(52) U.S. Cl.
CPC .................. *H04L 43/20* (2022.05)

(58) Field of Classification Search
CPC ......... H04L 43/08; H04L 43/20; H04L 43/50; G06F 11/3692; G06F 11/3688
See application file for complete search history.

(56) References Cited

U.S. PATENT DOCUMENTS 7,693,077 B2 * 4/2010 Kim .......................... H04L 1/24
370/252
8,572,290 B1 * 10/2013 Mukhopadhyay ...... H04L 47/70
709/251

(Continued)

OTHER PUBLICATIONS

International Search Report and Written Opinion in International Application No. PCT/US2024/038158, dated Oct. 10, 2024, 15 pages.

*Primary Examiner* — Jason D Recek
*Assistant Examiner* — Golam Mahmud
(74) *Attorney, Agent, or Firm* — Fish & Richardson P.C.

(57) ABSTRACT

Methods, systems, and apparatus, including computer programs encoded on computer-storage media, for improved network computing for network function testing. In some implementations, a method includes providing an application programming interface (API) to a user device of a network computing system; receiving input data from the user device indicating one or more application requirements for testing one or more network functions; generating one or more virtual processing machines using the one or more application requirements; obtaining testing data from one or more communication networks; providing the testing data to the one or more virtual processing machines configured to generate results based on processing the testing data using the one or more network functions; and providing the results to the user device.

16 Claims, 3 Drawing Sheets

(56) References Cited

U.S. PATENT DOCUMENTS

| | | | |
|---|---|---|---|
| 9,104,814 B1 | 8/2015 | Mompoint et al. | |
| 9,276,812 B1* | 3/2016 | Nagargadde | H04L 41/5054 |
| 10,229,039 B2 | 3/2019 | Cillis et al. | |
| 10,628,294 B2* | 4/2020 | Datta | G06F 11/3698 |
| 10,817,046 B2* | 10/2020 | Visconti | G06F 9/5094 |
| 11,397,658 B1* | 7/2022 | Pang | G06F 11/3433 |
| 11,704,229 B1* | 7/2023 | Li | G06F 11/3684 |
| | | | 717/126 |
| 2012/0174075 A1* | 7/2012 | Carteri | H04L 67/02 |
| | | | 717/127 |
| 2013/0152047 A1 | 6/2013 | Moorthi et al. | |
| 2014/0298298 A1* | 10/2014 | Cook | G06F 11/3684 |
| | | | 717/125 |
| 2015/0142953 A1* | 5/2015 | Bayen | H04L 43/08 |
| | | | 709/224 |
| 2020/0310852 A1* | 10/2020 | Featonby | G06F 9/45558 |
| 2021/0051058 A1 | 2/2021 | Ingah | |
| 2022/0116278 A1* | 4/2022 | Zhang | H04L 47/722 |
| 2022/0167187 A1* | 5/2022 | Jia | H04W 48/02 |
| 2023/0072149 A1 | 3/2023 | Watson et al. | |
| 2023/0156522 A1* | 5/2023 | Bashir | H04W 28/088 |
| | | | 370/329 |

* cited by examiner

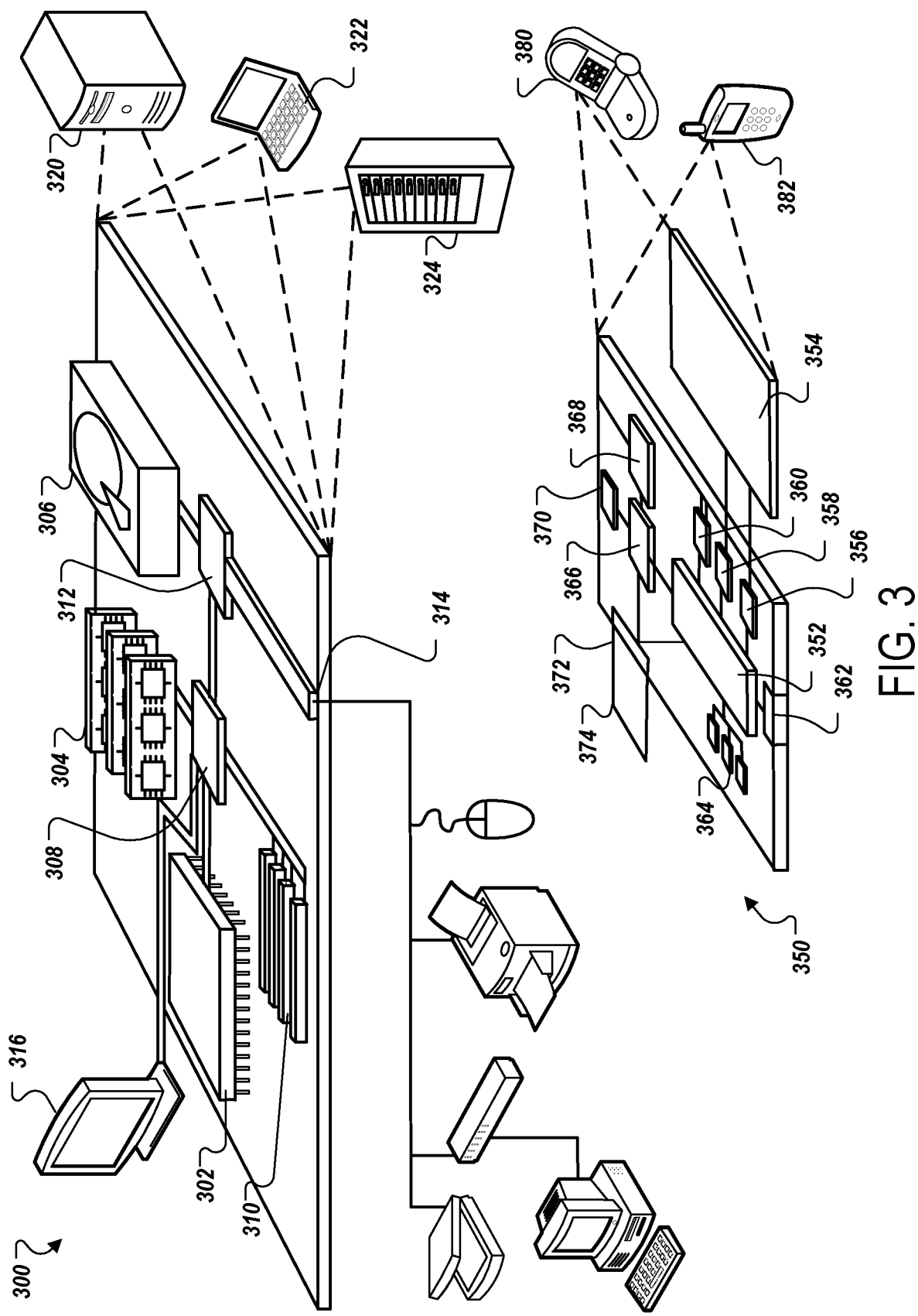

NETWORK COMPUTING FOR NETWORK FUNCTION TESTING

FIELD

This specification generally relates to a wireless communication systems, and more particularly, a method for improving network function testing on network computing resources used to manage one or more wireless communication networks.

BACKGROUND

Administering large wireless communication networks often require use of complex programs or applications some of which may be provided by third-party vendors. Applications are tested before being operated by a network computing system to ensure the application is compatible with the various network functions provided by the network computing system, potentially by multiple vendors.

SUMMARY

Administering of large networks from distributed computing resources—for example administering a cloud-based 5G New Radio wireless communication network—requires running a large numbers of network functions within the network environment. Applications providing such network functions can be developed independently by various vendors, and therefore require thorough testing (e.g., for bugs, compatibility with other applications and network resources, and vulnerabilities) before being deployed on actual network environments. Often providing a realistic testing environment for a particular network function or application can be time consuming, requiring significant coordination and instantiation, e.g., among various computing architectures or multiple entities and personnel. The technology described in this document provides solutions that streamline generation of appropriate testing environments for various applications, and potentially reduces the overall testing time significantly. This in turn allows for quick deployment of applications and network functions, allowing for fast improvements and scale-ups.

In some implementations, the techniques described include providing an application programming interface (API) to a user device of a network computing system; receiving input data from the user device indicating one or more application requirements for testing one or more network functions; generating one or more virtual processing machines using the one or more application requirements; obtaining testing data from one or more communication networks; providing the testing data to the one or more virtual processing machines configured to generate test results; and providing the test results to the user device.

In general, a network computing system, as described, can improve testing efficiency by dynamically adjusting processing resources. Processing resources can include one or more computers used to generate instances of virtual machines for network function testing. Processing resources can be adjusted by a network management unit. A network management unit can power up or power down one or more computing devices or portions thereof used in instances of virtual machines.

In some implementations, a network management unit can use run-time data to dynamically adjust processing resources. For example, a network management unit can determine a current time of day and adjust processing resources in accordance with estimates of demands at the corresponding times, e.g., by powering up or powering down one or more computing devices used to generate instances of virtual machines. A network management unit can parse input data from a user device indicating one or more application requirements—e.g., requirements indicated using one or more parameters—for testing to determine corresponding processing requirements. The network management unit can then adjust available processing resources to meet the processing requirements. Instances of virtual machines running on the processing resources can be used to execute network functions, e.g., processing network traffic data obtained from one or more communication networks by a network management unit.

In some implementations, a network management unit determines an identifier of the user device providing input data. In some cases, the network management unit can be configured to generate one or more instances of virtual machines without information on specific requirements. For example, the network management unit can generate one or more instances of virtual machines based on stored preferences indicative of typical virtual machine requirements for the user device. In some implementations, a set of virtual machine requirements can be specific to a particular type of test. For example, when testing a network function to obtain data for a webpage, a network management unit can be configured to determine the number and properties of virtual machines to be instantiated based on the network function itself, without receiving information about particular requirements from a user device. A testing system can reduce testing time by instantiating virtual machines based on one or more of a network function to be tested, a user device providing network function specification, or identifier provided by the user device, e.g., instead of instantiating virtual machines in response to processing of one or more requirements.

One innovative aspect of the subject matter described in this specification is embodied in a method that includes providing an application programming interface (API) to a user device of a network computing system; receiving input data from the API on the user device, the input data comprising one or more application parameters indicative of testing requirements for one or more network functions of a communications network; generating one or more virtual processing machines using the one or more application parameters; obtaining communications data from the communications network; providing the communications data to the one or more virtual processing machines configured to generate function results based on processing the communications data using the one or more network functions; and providing the results to the API on the user device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include obtaining a current time of day; determining that the current time of the day satisfies a threshold condition; and in response to determining that the current time of the day satisfies the threshold condition, adjusting one or more processing resources used to operate the one or more virtual processing machines.

In some implementations, adjusting the one or more processing resources used to operate the one or more virtual processing machines includes: generating an instruction to power on a computer of the one or more processing resources; and transmitting, to the computer or a controller of the computer, the instruction to power on the computer.

In some implementations, adjusting the one or more processing resources used to operate the one or more virtual processing machines includes: generating an instruction to power off a computer of the one or more processing resources; and transmitting, to the computer or a controller of the computer, the instruction to power off the computer.

In some implementations, the one or more application parameters represent an amount of processing bandwidth for processing of the one or more network functions. In some implementations, at least one of the one or more network functions include a network function generated by the user device and the input data includes the network function generated by the user device.

In some implementations, actions include determining that the one or more application parameters do not indicate an amount of processing bandwidth for processing of the one or more network functions; and determining one or more of the application parameters based on the user device providing an indication of at least one network function to test and a stored list of one or more predetermined application parameters.

In some implementations, actions include determining that the one or more application parameters do not indicate an amount of processing bandwidth for processing of the one or more network functions; and determining one or more of the application parameters based on the user device providing an identifier and a stored list of one or more predetermined processing requirements.

In some implementations, actions include subsequent to providing the communications data to the one or more virtual processing machines, deleting the one or more virtual processing machines. In some implementations, deleting the one or more virtual processing machines includes: adjusting an amount of memory in one or more hardware devices used to implement the one or more virtual processing machines.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a diagram illustrating an example of a computing system used improved network computing for network function testing.

Like reference numbers and designations in the various drawings indicate like elements.

DETAILED DESCRIPTION

Figure 1:
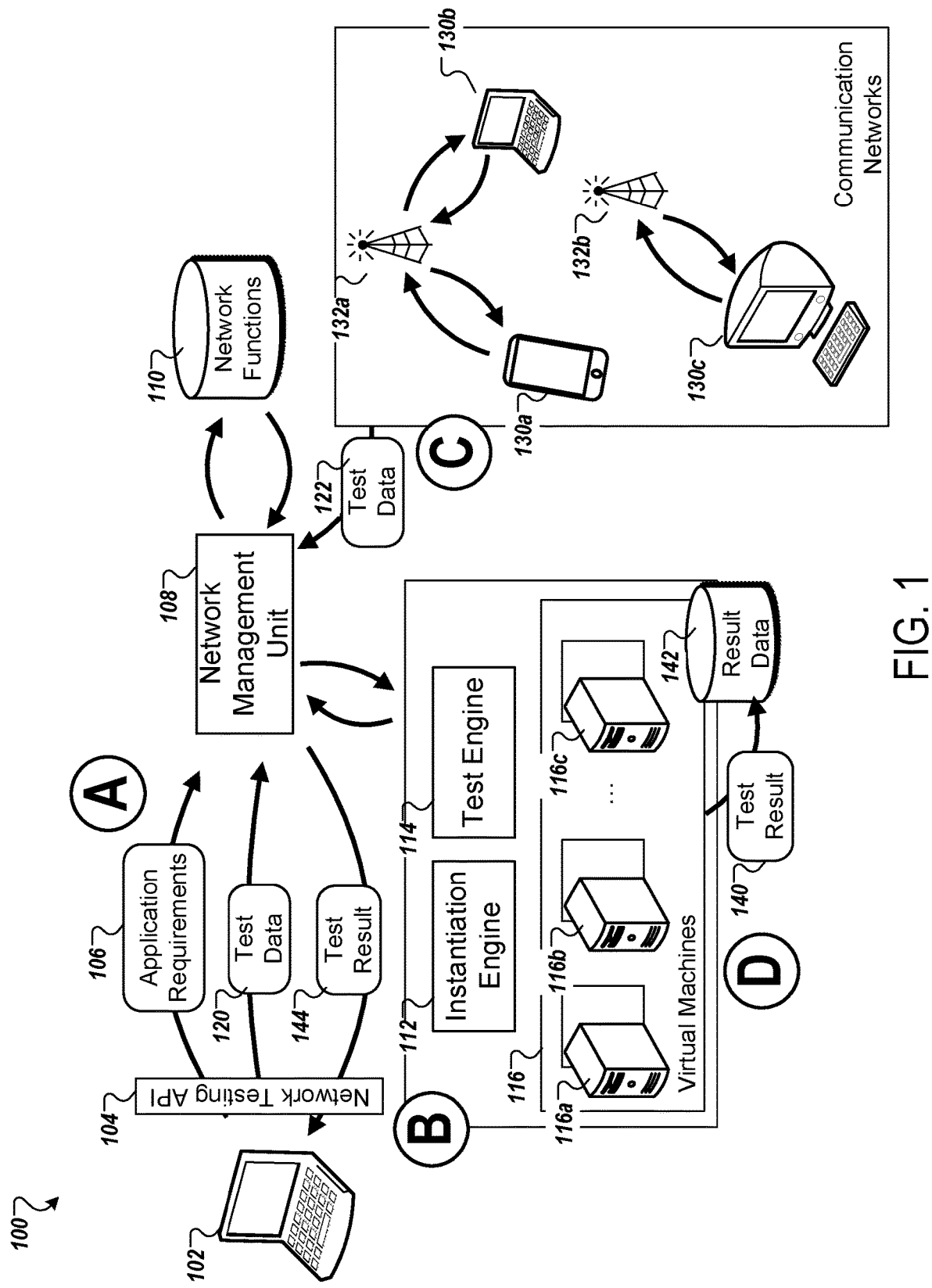
FIG. 1 is a diagram showing an example of a system for improved network computing for network function testing.

FIG. 1 is a diagram showing an example of a system 100 for improved network computing for network function testing. The system 100 includes a user device 102 communicably connected to the network management unit 108. The user device 102 can be a device of a user to be performing testing, e.g., on one or more network functions or computing resources, of a network managed by the network management unit 108. The network management unit 108 can generate virtual machines 116, including one or more of machines 116a, 116b, and 116c, to perform processing for one or more tests to be performed by the user device 102. In general, the network management unit 108 can generate one or more machines to perform processing for a given testing scenario.

FIG. 1 is described with reference to stages A through D. Although described in order from stage A through D, operations of the system 100 can occur in different orders or in parallel. For example, the network management unit 108 can obtain one or more instances of application requirements from one or more first users and in parallel generate one or more virtual machines for processing data based on previously obtained application requirement data from another user or users. Similarly, test data 122 can be obtained in parallel or in sequence with other processing described in references to FIG. 1 and the various stages A through D.

In some implementations, the network management unit 108 obtains test data 122 from a network of one or more devices to be used for one or more tests. The network management unit 108 can instantiate a machine for testing before, after, or during obtaining the test data 122.

In stage A, the network management unit 108 obtains the application requirements 106 from the user device 102 through the network testing application programming interface (API). In some implementations, the network management unit 108 generates the network testing API 104. The network testing API 104 can include one or more user interfaces or command lines for a user of the user device or automated program to provide the application requirements 106. The user device 102 can be communicably connected to the network management unit 108 by a wired or wireless network. Each of the user device 102 can the network management unit 108 can include one or more compute processors for, e.g., processing, sending, generating, or receiving data.

In stage B, the network management unit 108 obtains the application requirements 106 and uses the data of the application requirements 106 to generate the virtual machines 116. In some implementations, the application requirements 106 specify one or more network functions stored in network function database 110. For example, the network management unit 108 can obtain the specified one or more network functions from the database 110.

The application requirements 106 can include an amount of bandwidth, one or more network functions to test (e.g., an amount of testing data, a length of time to conduct a test, among others). In some implementations, the application requirements 106 includes infrastructure requirements for testing one or more network functions. One or more network functions can include functions generated by the user device 102 or pre-existing network functions available to the network management unit 108.

In some implementations, one or more network functions to test include one or more of the following: Access and Mobility Management Function (AMF), User Plane Function (UPF), or Session Management Function (SMF). In some implementations, AMF includes one or more functions for managing connection, mobility, registration or handling security functions such as Non-Access Stratum (NAS) ciphering and integrity protection. For example, NAS ciphering can include securely deliver signaling messages between user equipments (UEs) and Mobility Management Entity (MMEs) over radio links. NAS ciphering can include performing encryption of NAS signaling messages. Different keys can be used for integrity check and for ciphering.

In some implementations, UPF includes functions for packet routing and forwarding, traffic usage reporting, and Quality of Service (QoS) handling for the user plane. QoS handling can include one or more functions that work on a network to help guarantee its ability to dependably run high-priority applications and traffic under limited network capacity. QoS can accomplish this by providing differentiated handling and capacity allocation to specific flows in network traffic. This enables a network administrator to assign an order in which packets are handled and provide an appropriate amount of bandwidth to each application or traffic flow.

In some implementations, SMF is a component of 5G Service-Based Architecture (SBA) that interacts with the decoupled data plane. The decoupled data plane refers to the separation of the data plane from the control plane in a network architecture that can allow for more flexibility and programmability in network administration. In some implementations, networking includes three planes (data plane, control plane, and management plane) that are implemented in a firmware of routers and switches. Software-defined networking (SDN) can decouple the data and control planes and implement a control plane in software instead, which enables programmatic access to make network administration more flexible. SMF can include one or more functions for creating, updating, or removing Protocol Data Unit (PDU) sessions and managing session context with the User Plane Function (UPF).

In some implementations, the network management unit 108 operates an instantiation engine 112 and a test engine 114. For example, the instantiation engine 112 can be configured to instantiate one or more of the virtual machines 116 according to the application requirements 106. Instantiating can include instructing one or more processors on one or more computers to isolate a portion of computer memory or processing power to be used for subsequent processing, storage, or other computer actions performed by the instantiated virtual machine. Virtual machines can be hosted by one or more cloud computing hosting networks.

In some implementations, instead of or in addition to generating virtual machines, the system 100 provides hardware sufficient for the application requirements 106. For example, the network management unit 108 can generate and transmit one or more signals configured to turn off or on one or more hardware computing elements to satisfy the application requirements 106.

In one example case, the user device 102 can perform testing for hosting one or more compute processing on a webpage. The user device 102 can provide, in the application requirements 106 one or more functions to be performed by a network managed by the network management unit 108. The one or more functions can include functions for providing or accessing data or computing obtained data according to processes on the given webpage. Of course, a webpage use case is given only as an example and the system 100 can be used for other forms of network testing.

In stage C, the network management unit 108 obtains test data 120 or test data 122. In some implementations, the network management unit 108 obtains both the test data 120 and 122. In some implementations, the network management unit 108 only obtains one of the test data 120 or the test data 122. Both the test data 120 and 122 can include user traffic data represented, e.g., as Packet Capture (PCAP) data. PCAP data can include captures of live network packet data, e.g., from Open Systems Interconnection (OSI) model Layers 2-7. Network analyzers can create .pcap files to collect and record packet data from a network. PCAP data can include an entirety of one or more packets included in network traffic (e.g., both metadata and content) between devices of a network, such as device 130a and device 132a shown in FIG. 1.

The test data 120 can include data provided by the user device 102. The test data 122 can include data obtained by the network management unit 108 from one or more communication networks shown graphically in FIG. 1 as a collection of devices 130a-c and access points 132a-b. One or more of the devices 130a-c can access a given process operated by the user device 102. For example, in the example of the webpage, the devices 130a-c can include devices accessing the webpage and using one or more processing resources on the webpage. Such processing can be performed by the instantiated virtual machines 116. Results of the processing can be provided, e.g., by the network management unit 108 or the virtual machines 116 within the test result 140 or as intermediate results included in a subsequently generated test result 140 that includes one or more intermediate testing results computed for one or more of the devices 130a-c.

In stage D, one or more of the instantiated virtual machines 116 process test data to generate a test result. In some implementations, the testing engine 114 operates one or more input or output operations of the instantiated virtual machines 116. In some implementations, the testing engine 114 is controlled by the network management unit 108. In one example case, the virtual machine 116a can obtain the test data 122 or the test data 120 and generate the test result 140. The test result 140 can be a result of one or more network functions.

In some implementations, the test result 140 includes a representation of one or more generated test results. For example, the test result 140 can be generated at the end of a testing period or periodically throughout a testing period to provide metrics on a generated set of one or more testing results. The test result 140 can include bandwidth of a given network managed by the network management unit 108 used for testing, a number of failures, an efficiency of one or more processing devices, among other metrics.

In some implementations, the network management unit 108 provides the test result 140 to the user device 102. For example, the network management unit 108 can provide the test result 140 as the test result 144 through the network testing API 104 to the user device 102. The test result 144 can be a subset of test result 140, encoded form of test result 140, among others. In some implementations, the user device 102 can access data of the generated test result 140 using the API 104. In some implementations, the test result 140 can include one or more JSON files or other file types for representing one or more connections, network function output, or other intermediary output of testing on a network managed by the network management unit 108.

Figure 2:
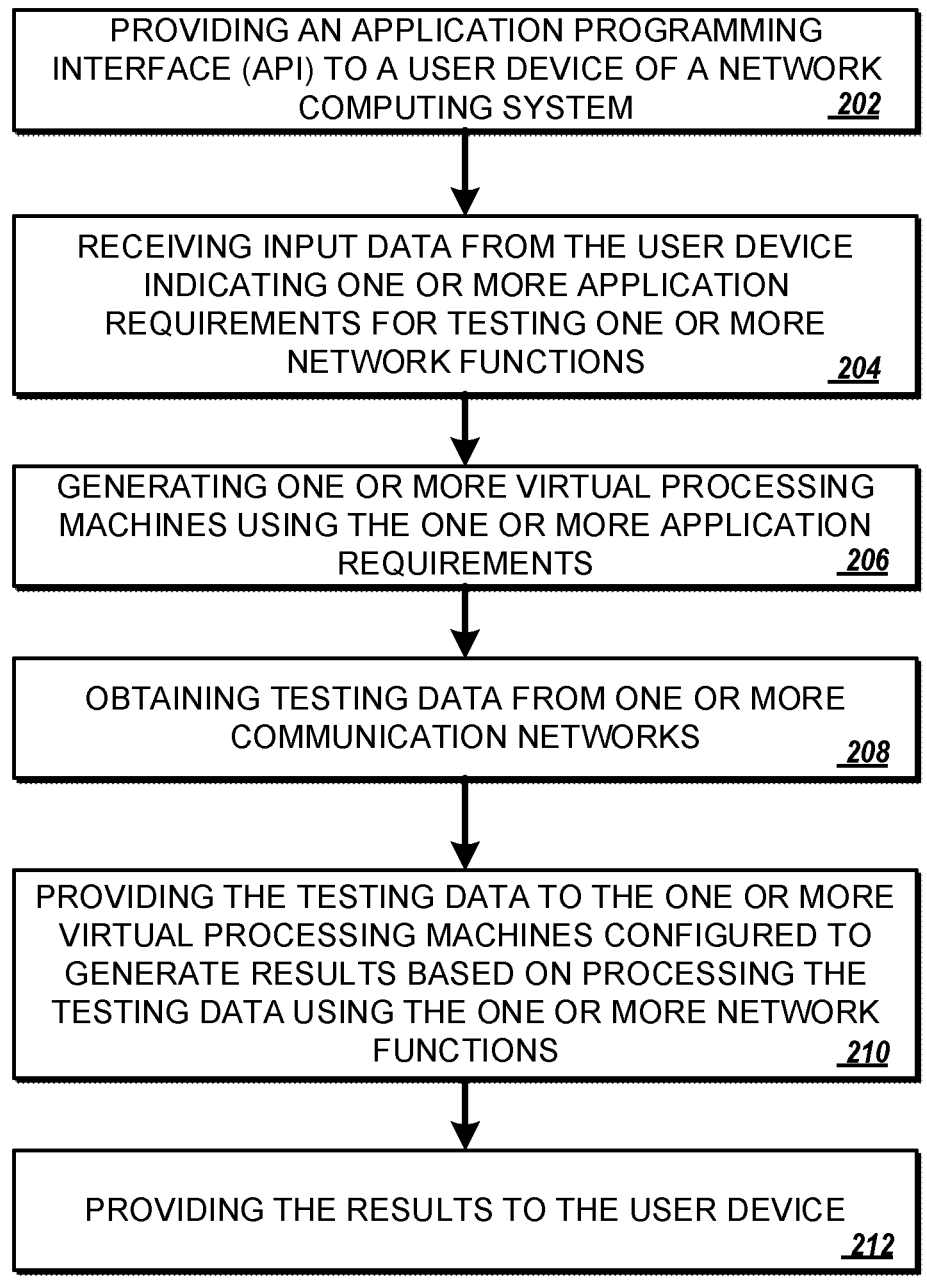
FIG. 2 is a flow diagram illustrating an example of a process for improved network computing for network function testing.

FIG. 2 is a flow diagram illustrating an example of a process 200 for improved network computing for network function testing. The process 200 may be performed by one or more electronic systems, for example, the system 100 of FIG. 1.

The process 200 includes providing an application programming interface (API) to a user device of a network computing system (202). For example, the network management unit 108 can provide the API 104 to the device 102, as described in reference to FIG. 1. The API 104 can be used for one or more communications between the device 102 and the network management unit 108. The API 104 can include one or more user interface elements for the user to provide elements of the application requirements 106. After the user device 102 enters data in one or more interface elements of the API 104, the API 104 can provide the data to the network management unit 108.

The process 200 includes receiving input data from the user device indicating one or more application requirements for testing one or more network functions (204). For example, the network management unit 108 can obtain the application requirements 106 from the user device 102 or through the API 104 based on data provided by the user device 102. The network management unit 108 can receive the application requirements 106 over one or more wired or wireless networks connecting the device 102 with the network management unit 108.

In some implementations, the one or more application requirements include one or more processing requirements indicating an amount of processing bandwidth for processing of the one or more network functions. For example, the application requirements 106 can include an indication of one or more network functions to be tested. The network management unit 108 can include one or more values indicating an amount or type of processing for a given function. The network management unit 108 can use specified amounts of processing power or other data in the application requirements 106 to determine how many and what type of machines to generate, e.g., virtual machines or hardware devices, higher cost higher bandwidth hardware infrastructures or lower cost infrastructures for less demanding network function processing, among others.

In some implementations, at least one of the one or more network functions include a network function generated by the user device of the network computing system and the input data includes the network function generated by the device of the user device. For example, the user device 102 can generate a network function and test the function on a network managed by the network management unit 108. The function can be provided as code or a reference or pointer to externally hosted code, such as GitHub, among other external hosting sites.

The process 200 includes generating one or more virtual processing machines using the one or more application requirements (206). For example, the instantiation engine 112 can instantiate one or more of the virtual machines 116 using the application requirements 106. Instantiating a machine can include identifying a portion of memory or processing bandwidth to be used, for a given hardware device, for processing of subsequent testing data. Instantiating a machine can include generating and transmitting a signal to a cloud hosting computing environment to generate one or more machines for processing data. In some implementations, the instantiation engine 112 is operated by one or more processors of the network management unit 108.

The process 200 includes obtaining testing data from one or more communication networks (208). For example, the network management unit 108 can obtain the test data 120 and the test data 122. In general, the network management unit 108 can obtain testing data from the user device 102 or one or more networks managed, at least in part, by the network management unit 108. Test data can include user traffic data, e.g., users operating one or more network functions being tested. For example, if a network function requires a set of 10 processes to occur based on input data provided by a given device, such as the device 130a, testing data can include request data provided by the device 130a requesting to perform the network function including the set of 10 processes. Such processes can be processed by one or more instantiated machines, such as machines 116.

The process 200 includes providing the testing data to the one or more virtual processing machines configured to generate results based on processing the testing data using the one or more network functions (210). For example, test data obtained by the network management unit 108 can be provided to the test engine 114 for processing by one or more instantiated machines 116. As described in the above example, a user requesting data with given parameters for processing a given network function can be included in either the test data 120 or the test data 122. The network management unit 108 can provide the test data 120 or the test data 122 to one or more of the virtual machines 116.

The process 200 includes providing the results to the user device (212). For example, one or more of the virtual machines 116 can generate the result 140 based on test data provided by the network management unit 108. The network management unit 108 can obtain the test result 140 and provide the test result 140 to the user device 102. The test result 140 can include one or more intermediary results generated by one or more of the virtual machines in response to receiving one or more requests from user devices in a network managed by the network management unit 108, such as the device 130a or 130c. The network management unit 108 can provide test results through a period of testing or at the end after testing has concluded, e.g., as a summary of one or more computing events that occurred during testing.

In some implementations, the process 200 includes obtaining a current time of day; comparing the current time of day to a threshold time; and in response to comparing the current time of day to the threshold time, adjusting one or more processing resources used to operate the one or more virtual processing machines. For example, the network management unit 108 can generate and transmit a signal configured to power on or power off one or more of the machines 116. In some implementations, the network management unit 108 can provide a signal to a cloud computing network configured to automatically power on or power off compute resources based on one or more factors. In some implementations, the application requirements 106 include details for maintaining processing for a given traffic load. For example, the application requirements 106 can include an exact or range of processing required for different values of user traffic. In some implementations, the network management unit 108 can use information in the application requirements 106 indicating an exact or range of processing required for different values of user traffic to configure scaling up or down compute resources, e.g., turning off or turning on hardware components or generating or deleting virtual machines.

In some implementations, adjusting the one or more processing resources used to operate the one or more virtual processing machines includes generating an instruction to power on a computer of the one or more processing resources, where the instruction is configured to power on the computer when received by the computer or a controller of the computer; and transmitting, to the computer or the controller of the computer, the instruction to power on the computer. In some implementations, adjusting the one or more processing resources includes transmitting an instruction to a cloud computing network indicating conditions that trigger powering on or powering off one or more network resources, such as hardware processors.

In some implementations, adjusting the one or more processing resources used to operate the one or more virtual processing machines includes generating an instruction to power off a computer of the one or more processing resources, where the instruction is configured to power off the computer when received by the computer or a controller of the computer; and transmitting, to the computer or the controller of the computer, the instruction to power off the computer.

In some implementations, the process 200 includes determining the one or more application requirements do not include at least one processing requirement indicating an amount of processing bandwidth for processing of the one or more network functions; and determining one or more processing requirements based on the user device providing an indication of at least one network function to test and a stored list of one or more predetermined processing requirements. For example, the network management unit 108 can parse the application requirements 106 to determine whether or not the application requirements 106 include an indication of one or more network functions to be tested.

The network management unit 108 can compare an indicated one or more network functions to a set of network function identifiers each associated with a processing bandwidth or a range of processing bandwidth. The network management unit 108 can then instantiate one or more machines, such as the machines 116, to satisfy the range of processing bandwidth or exact value specified in the set of identifiers, e.g., depending on current network processing load assigning more or less compute resources for a given test.

In some implementations, the process 200 includes determining the one or more application requirements do not include at least one processing requirement indicating an amount of processing bandwidth for processing of the one or more network functions; and determining one or more processing requirements based on the user device providing an identifier and a stored list of one or more predetermined processing requirements. For example, the network management unit 108 can parse the application requirements 106 to determine whether or not the application requirements 106 include an indication of an amount of processing required for testing. The network management unit 108 can assign a template or other stored measure of bandwidth based on other factors, such as time of day, other current tests, among others.

The network management unit 108 can compare an identifier of the device 102 to a set of identifiers each associated with a processing bandwidth or a range of processing bandwidth. The network management unit 108 can then instantiate one or more machines, such as the machines 116, to satisfy the range of processing bandwidth or exact value specified in the set of identifiers, e.g., depending on current network processing load assigning more or less compute resources for a given test.

In some implementations, the process 200 includes deleting one or more of the virtual machines 116 after generating a test result 140. For example, the network management unit 108 can be configured to, after obtaining the test result 140, remove one or more of the virtual machines 116 corresponding to virtual machines generated for the corresponding test now providing a result. In this way, the network management unit 108 can automatically generate and delete virtual machines, e.g., on a cloud computing environment, as testing requirements are met and remove such virtual machines when testing is complete.

In general, the system 100 can include a unique environment or architectural design for application testing. The system 100 can create an instance for an application, such as virtual machine, and destroy it if the application has been tested. Destroying or deleting can include setting one or more bits to 0, randomized or pseudo-randomized values, or a corresponding starting value from before a virtual machine was generated. Deleting can include adjusting one or more bits, e.g., directly adjusting bits or providing a generated signal to a system where the system manages the virtual machines and the signal is configured to delete the virtual machines. A signal can be configured to delete one or more virtual machines in response to a condition or at a given time.

The system 100 can perform testing and measure results from the testing include tracking one or more metrics of interest for a given application and expose testing data and results to a data platform, e.g., a platform used by a device performing testing. The system 100 can serve multi-application flexibility and can have elastic capabilities to shrink or expand according to a given tested network function's requirements. The system 100 can allow a wide range of vendors to perform testing and provide innovative solutions operable on a given network, e.g., a network managed by the network management unit 108.

FIG. 3 is a diagram illustrating an example of a computing system used improved network computing for network function testing. The computing system includes computing device 300 and a mobile computing device 350 that can be used to implement the techniques described herein. For example, one or more components of the system 100 could be an example of the computing device 300 or the mobile computing device 350, such as a computer system implementing the network management unit 108, devices that access information from the network management unit 108, or a server that accesses or stores information regarding the operations performed by the network management unit 108.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 302 is a single threaded processor. In some implementations, the processor 302 is a multi-threaded processor. In some implementations, the processor 302 is a quantum computer.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine readable mediums (for example, the memory 304, the storage device 306, or memory on the processor 302). The high-speed interface 308 manages bandwidth-intensive operations for the computing device 300, while the low-speed interface 312 manages lower bandwidth-intensive operations. Such allocation of functions is an example only. In some implementations, the high speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may include one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry in some cases. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 368 using a radio frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, among others) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for network application testing comprising:
   providing an application programming interface (API) to a user device of a network computing system;
   receiving input data from the API on the user device, the input data comprising one or more application parameters indicative of testing requirements for one or more network functions of a communications network that connects at least two user devices;
   determining that the one or more application parameters do not indicate an amount of processing bandwidth for processing of the one or more network functions;
   in response to determining that the one or more application parameters do not indicate an amount of processing bandwidth, determining one or more of the application parameters based on the user device providing:
      an indication of at least one network function to test and a stored list of one or more predetermined application parameters, or
      an identifier and a stored list of one or more predetermined processing requirements;
   generating one or more virtual processing machines using the one or more application parameters;
   obtaining communications data indicating user traffic between the at least two user devices over the communications network;
   providing the communications data to the generated one or more virtual processing machines configured to generate function results based on processing the communications data using the one or more network functions; and
   providing the results to the API on the user device.

2. The method of claim 1, comprising:
   obtaining a current time of day;
   determining that the current time of the day satisfies a threshold condition; and
   in response to determining that the current time of the day satisfies the threshold condition, adjusting one or more processing resources used to operate the one or more virtual processing machines.

3. The method of claim 2, wherein adjusting the one or more processing resources used to operate the one or more virtual processing machines comprises:
   generating an instruction to power on a computer of the one or more processing resources; and
   transmitting, to the computer or a controller of the computer, the instruction to power on the computer.

4. The method of claim 2, wherein adjusting the one or more processing resources used to operate the one or more virtual processing machines comprises:
   generating an instruction to power off a computer of the one or more processing resources; and
   transmitting, to the computer or a controller of the computer, the instruction to power off the computer.

5. The method of claim 1, wherein the one or more application parameters represent an amount of processing bandwidth for processing of the one or more network functions.

6. The method of claim 1, wherein at least one of the one or more network functions include a network function generated by the user device and the input data includes the network function generated by the user device.

7. The method of claim 1, comprising:
   subsequent to providing the communications data to the one or more virtual processing machines, deleting the one or more virtual processing machines.

8. The method of claim 7, wherein deleting the one or more virtual processing machines comprises:
   adjusting an amount of memory in one or more hardware devices used to implement the one or more virtual processing machines.

9. A non-transitory computer-readable medium storing one or more instructions executable by a computer system to perform operations comprising:

providing an application programming interface (API) to a user device of a network computing system;

receiving input data from the API on the user device, the input data comprising one or more application parameters indicative of testing requirements for one or more network functions of a communications network that connects at least two user devices;

determining that the one or more application parameters do not indicate an amount of processing bandwidth for processing of the one or more network functions;

in response to determining that the one or more application parameters do not indicate an amount of processing bandwidth, determining one or more of the application parameters based on the user device providing:

an indication of at least one network function to test and a stored list of one or more predetermined application parameters, or an identifier and a stored list of one or more predetermined processing requirements;

generating one or more virtual processing machines using the one or more application parameters;

obtaining communications data indicating user traffic between the at least two user devices over the communications network;

providing the communications data to the generated one or more virtual processing machines configured to generate function results based on processing the communications data using the one or more network functions; and providing the results to the API on the user device.

10. The medium of claim 9, wherein the operations comprise:

obtaining a current time of day;

determining that the current time of the day satisfies a threshold condition; and in response to determining that the current time of the day satisfies the threshold condition, adjusting one or more processing resources used to operate the one or more virtual processing machines.

11. The medium of claim 10, wherein adjusting the one or more processing resources used to operate the one or more virtual processing machines comprises:

generating an instruction to power on a computer of the one or more processing resources; and transmitting, to the computer or a controller of the computer, the instruction to power on the computer.

12. The medium of claim 10, wherein adjusting the one or more processing resources used to operate the one or more virtual processing machines comprises:

generating an instruction to power off a computer of the one or more processing resources; and transmitting, to the computer or a controller of the computer, the instruction to power off the computer.

13. The medium of claim 9, wherein the one or more application parameters represent an amount of processing bandwidth for processing of the one or more network functions.

14. The medium of claim 9, wherein at least one of the one or more network functions include a network function generated by the user device and the input data includes the network function generated by the user device.

15. The medium of claim 9, wherein the operations comprise:

subsequent to providing the communications data to the one or more virtual processing machines, deleting the one or more virtual processing machines.

16. A system, comprising:

one or more processors; and machine-readable media interoperably coupled with the one or more processors and storing one or more instructions that, when executed by the one or more processors, perform operations comprising:

providing an application programming interface (API) to a user device of a network computing system;

receiving input data from the API on the user device, the input data comprising one or more application parameters indicative of testing requirements for one or more network functions of a communications network that connects at least two user devices;

determining that the one or more application parameters do not indicate an amount of processing bandwidth for processing of the one or more network functions;

in response to determining that the one or more application parameters do not indicate an amount of processing bandwidth, determining one or more of the application parameters based on the user device providing:

an indication of at least one network function to test and a stored list of one or more predetermined application parameters, or an identifier and a stored list of one or more predetermined processing requirements;

generating one or more virtual processing machines using the one or more application parameters;

obtaining communications data indicating user traffic between the at least two user devices over the communications network;

providing the communications data to the generated one or more virtual processing machines configured to generate function results based on processing the communications data using the one or more network functions; and providing the results to the API on the user device.

* * * * *